Figure 1:
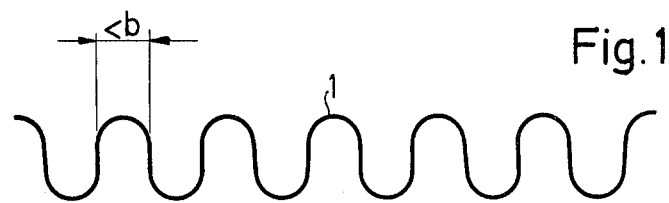

United States Patent [19]
Siegwart

[11] 3,913,623
[45] Oct. 21, 1975

[54] FLEXIBLE CORRUGATED TUBE

[76] Inventor: Emil Siegwart, Michael-Blatter-Strasse 6, D 6603 Sulzbach-Neuweiler, Germany

[22] Filed: Aug. 2, 1973

[21] Appl. No.: 377,984

[30] Foreign Application Priority Data
July 17, 1972  Germany............................ 2235012

[52] U.S. Cl................................. 138/122; 138/136
[51] Int. Cl.² .......................................... F16L 11/16
[58] Field of Search ........... 138/122, 121, 129, 173, 138/134, 135, 136; 29/254; 72/50

[56] References Cited
UNITED STATES PATENTS

| | | | |
|---|---|---|---|
| 967,260 | 8/1910 | Witzenmann et al.............. | 138/122 |
| 1,064,432 | 6/1913 | Berryman et al.................. | 138/136 |
| 1,068,553 | 7/1913 | Abell et al. ....................... | 138/135 |
| 1,978,529 | 10/1934 | Harrah............................. | 138/122 X |
| 2,132,189 | 10/1938 | Roemer ............................ | 138/136 |
| 2,191,690 | 2/1940 | Witzenmann...................... | 138/122 |
| 2,876,801 | 3/1959 | November ......................... | 138/121 |
| 2,890,723 | 6/1959 | Evert ................................ | 138/122 |

FOREIGN PATENTS OR APPLICATIONS
907,095   10/1962   United Kingdom................ 138/122

*Primary Examiner*—Richard C. Queisser
*Assistant Examiner*—Daniel M. Yasich

[57] ABSTRACT

A flexible corrugated tube of a succession of axially displaced convolutions obtained by spirally coiling a metal strip. The strip is formed with longitudinally extending corrugations which are substantially of wave form. The borders of successive tube convolutions overlap each other, with at least one corrugation in the overlapping border portion of a convolution fitting into a corrugation of the overlapped border portion of an adjoining convolution, with the crests and troughs of the corrugations wider than the portions therebetween. The two corrugations are thereby locked to each other in the manner of hooks or teeth which engage each other.

1 Claim, 6 Drawing Figures

FLEXIBLE CORRUGATED TUBE

This invention relates to a flexible corrugated tube consisting of a succession of axially displaced convolutions obtained by spirally coiling a thin metal strip formed with longitudinally extending corrugations which in the finished tube are transformed into spirals coaxial with the tube. Tubes of this kind are known.

The invention relates in particular to a tube in which the borders of successive tube convolutions overlap each other.

In the tube according to the invention the corrugations formed in the strip are substantially of wave form, the waves having arcuate crests alternating with similarly shaped troughs.

It is an object of the present invention to provide a flexible corrugated tube as described above in which successive convolutions are firmly secured to each other along their overlapping borders without the use of special connecting means, adhesives or the like.

According to the present invention there is provided a flexible corrugated tube consisting of a succession of axial displaced convolutions obtained by spirally coiling a thin metal strip formed with longitudinally extending corrugations, the corrugations being substantially of wave form, the waves having arcuate crests alternating with similarly shaped troughs, the borders of successive tube convolutions overlapping each other, with at least one corrugation in the overlapping border portion of a convolution fitting into a corrugation of the overlapped border portion of an adjoining convolution so that the two corrugations are locked to each other in the manner of hooks or teeth which engage each other.

In accordance with a preferred embodiment of the invention a cross-section of at least those corrugations which fit into each other is substantially that of the waves in a maeander, with the width of the corrugations at their crests and at their troughs being greater than between their flanks.

According to a further feature of the invention a plurality of corrugations in the overlapping border portion of a convolution is fitted into an equal number of corrugations in the border portion of an adjoining convolution; the overlapping border portions of the convolutions may extend in some cases substantially over half the width of the strip from which they are formed.

The invention relates further to a method of producing a flexible corrugated tube as described above and to apparatus for carrying out this method.

Accordingly the invention provides a method of producing a flexible corrugated tube as set forth in the proceeding paragraphs in which spirally coiling of the thin metal strip is performed in such a way that at least one corrugation in the overlapping border portion of a convolution is fitted into a corrugation in the overlapped border portion of the adjoining convolution and in which simultaneously with or immediately after the fitting of one corrugation into another the corrugations are reduced in height by compression in such a way that the cross-section of at least those corrugations which fit into each other is substantially that of the waves in a maeander, with the width of the corrugations at their crests or at their troughs being greater than in-between crests and troughs.

The compression may be produced by applying substantially at the apex of the wave troughs a pressure in the direction of the wave crests. The compression may also be produced by applying a tensile force to the strip in its longitudinal direction whilst the strip is spirally coiled on a mandrel. Alternatively the compression may be produced by applying substantially at the apex of the wave crests a pressure in the direction of the wave troughs.

A sealing strip may be coiled between corrugations whilst they are being fitted into each other. This strip may be made of plastics material or of paper. The sealing strip may be heated whilst the corrugations are reduced in height and the strip may be used or bonded to the walls of corrugations inbetween which the sealing strip is coiled.

A sealing tape extending in the longitudinal direction of the metal strip may be bonded to at least one of the two lateral edges of said metal strip, the sealing strip projecting laterally beyond the strip edge; and between or after coiling of the metal strip into convolutions the sealing tape bonded to one convolution is bonded to the border portion of the adjoining convolution.

The tube may be formed by spirally coiling a corrugated metal strip, the height of the corrugations in the strip being larger than the width of the corrugations. The height of the corrugations may be at least twice as great as their width.

Apparatus for carrying out the method set forth for producing a flexible metal tube comprises preferably a rotatable mandrel onto which the strip is coiled and at least one pressure roller adapted to cooperate with the mandrel and arranged from the mandrel at a distance corresponding to the thickness of the metal strip, the pressure roller being provided with grooves for receiving the corrugations of the strip.

At least over part of the axial length of the pressure roller the grooves may be shallower and at least at their bottom wider than the corrugations in the metal strip prior to its compression and in which the width of ridges situated between the grooves may at least at the bottom of the grooves be less than the width of the corrugations prior to their compression.

One of the pressure rollers may be arranged facing the mandrel and at the place where the oncoming metal strip makes first contact with the mandrel, the pressure roller being axially offset in the direction of that area of the mandrel surface onto which the convolutions of the strip are coiled and in which that surface area of the offset pressure roller which is in contact with the oncoming strip has grooves of a depth which is at least as great as the unreduced height of the corrugations.

The pressure roller may be arranged at an angle to the mandrel which is equal to the angle of pitch of the convolutions.

In a preferred form of the apparatus three pressure rollers are provided, the latter being distributed around the periphery of the mandrel and spaced-apart from each other by an arc subtended by an angle of 120°.

The pressure roller may be made from an elastically yielding material.

A tube according to the invention as well as a method and apparatus for producing it will described by way of example with reference to the accompanying drawings.

Figure 2:
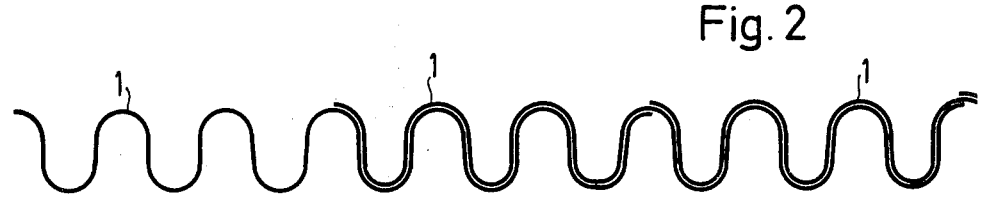
Figure 3:
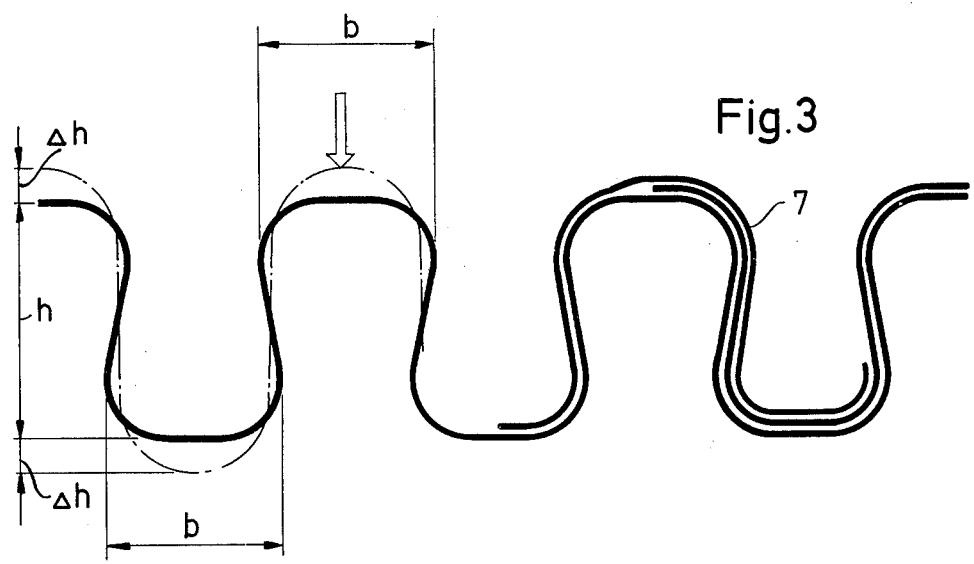
Figure 6:
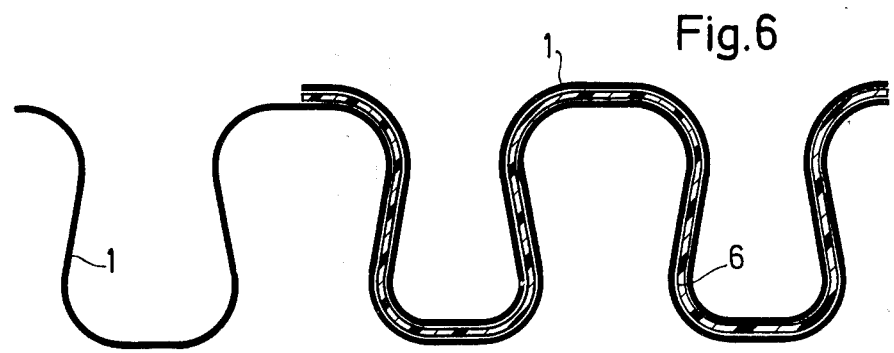
Figure 4:
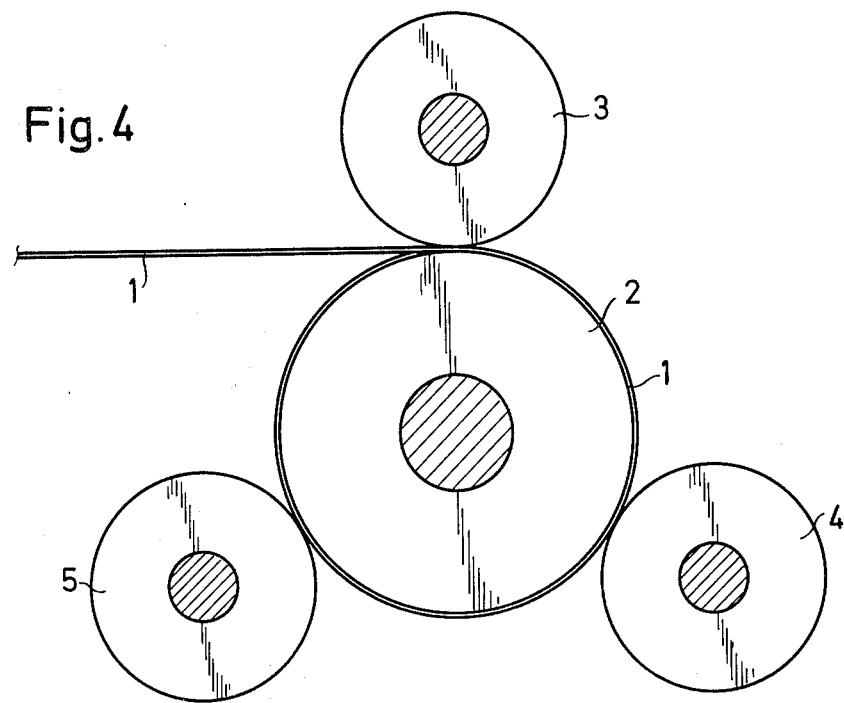
Figure 5:
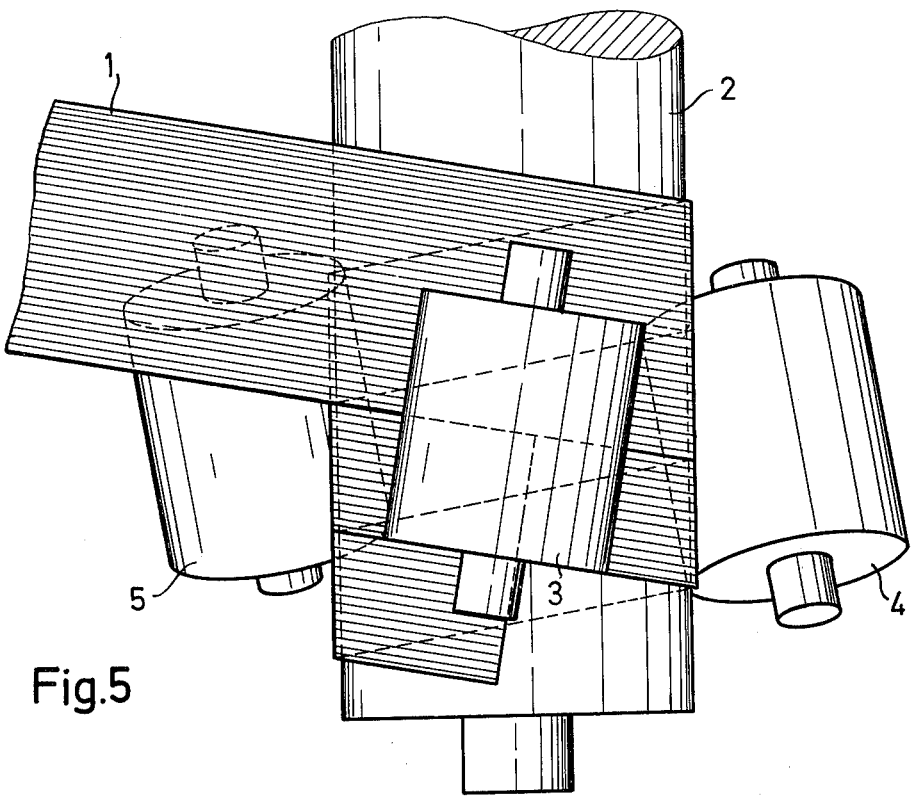

FIG. 1 is a cross-section of a thin metal strip, formed with longitudinally extending corrugations from which a tube according to the invention is produced, FIG. 2 is a section through part of a wall of a tube, produced from the metal strip shown in FIG. 1, prior to compression of the interfitting corrugations of successive tube convolutions, FIG. 3 is a section to an enlarged scale of the part of the tube wall shown in FIG. 2, after compression of the interfitting corrugations, FIG. 4 is a vertical section through an apparatus for compressing the corrugations in the metal strip of FIG. 1 whilst it is being coiled onto a mandrel, FIG. 5 is a plan view of the apparatus of FIG. 4, FIG. 6 is a section similar to that of FIG. 3 through part of a wall of a corrugated tube, with a sealing strip inserted between the overlapping borders of successive convolutions.

The starting material for a tube according to the invention is a thin metal strip 1 with longitudinally extending corrugations. As shown in FIG. 1, the corrugations are substantially of wave form, the waves having arcuate crests alternating with similarly shaped troughs. The height of the corrugations is larger than their width and it is preferred to make this height at least twice as great as the width, as shown in the case of the corrugations illustrated in chain-lines in FIG. 3.

In order to produce a tube according to the invention, the strip 1 is spirally coiled onto a rotary driven mandrel 2 (FIGS. 4 and 5) in an oblique direction and at a predetermined angle of pitch, the interior diameter of the tube corresponding to the diameter of the mandrel. The angle of pitch is so selected that successive spirally coiled convolutions of the tube overlap each other along their borders, the extent of overlap being determined by the angle of pitch. In the embodiment shown in the drawings the angle of pitch is such that successive convolutions overlap each other for about half the width of the strip 1. FIG. 2 is a section through part of a wall of the tube produced from strip 1. In the case of FIG. 1 the strip has six corrugations whose width is less than $b$ and as shown in FIG. 2 half of the width of each convolution of the strip overlaps half of the adjoining convolution so that the overlapping portion in each convolution has three corrugations.

As will be seen from FIG. 2, the corrugations in overlapping borders fit into each other in that manner that waves and crests of adjacent convolutions enter each other. In order to ensure a firm and secure union between the interfitting corrugations of successive convolutions, the corrugations are so deformed during or subsequent to the coiling of the strip into a tube that the corrugations have a greater width at their crests and at their troughs than between their flanks. FIG. 3 shows part of a wall of a tube which has been deformed in this manner. The deformation of the corrugations may be carried out by reducing their height by compression whereby the arcuate crests and troughs are flattened and at the same time their width increased. The reduction in height is effected in the case of FIG. 3 by compression applied in the direction of the arrow of that FIGURE, the direction perpendicular to the width of the corrugations, with the corrugations being supported at their troughs, i.e. at the lower part of FIG. 3. In this way the original height of the corrugations is reduced by two times $\Delta h$, whilst the crests and the troughs of the corrugations are enlarged from $<b$ to $b$.

A compressive force in the direction shown in FIG. 3 can also be obtained by applying a tensile force to the strip in its longitudinal direction whilst the strip is spirally coiled onto the mandrel. As a result of the strip being curved around the mandrel an increased tensile stress is exerted on the crests of the corrugations which are remote from the mandrel and this stress is transformed into a compressive force directed radially towards the mandrel. This force results in a reduction in height of the corrugations. Alternatively or additionally a compressive force may be obtained by means of pressure rollers which are distributed around the mandrel.

An embodiment of an apparatus having such pressure rollers is shown in FIG. 4. In the case of this apparatus, the strip 1 enters into contact with the circumference of the rotary driven mandrel at a predetermined angle of pitch, the pitch being so selected that successive convolutions of the tube overlap each other by half the width of the strip. At the place where the oncoming strip makes the first contact with the mandrel, a first pressure roller 3 is arranged which is axially offset relative to the oncoming strip 1 by half the strip width, the roller being offset in the direction of that area of the mandrel surface onto which the convolutions of the strip are coiled and the axis of the roller being obliquely arranged relative to that of the mandrel at an angle which corresponds to the desired angle of pitch. The pressure roller 3 is provided at its surface with circumferential grooves into which the corrugations of the strip enter when the latter passes the gap between mandrel and pressure roller 3. The depth of the grooves provided in the area of the pressure roller in contact with the oncoming strip is at least as great as the unreduced height of the strip corrugations so that these corrugations are not deformed whilst in contact with that roller area. The remainder of the roller are — which extends over the previously-formed convolution — has grooves of reduced depth which at least at their bottom are wider than the corrugations prior to their compression, whilst the width of the ridges situated between the grooves is at least at the bottom of the grooves less than the width of the corrugations prior to their compression. When the strip passes between the mandrel and the pressure roller 3, the afore-described configuration of the grooves causes the corrugations to be reduced in height which results in the cross-section of the corrugations having a shape as shown in FIG. 3 which can also be described as resembling a capital Greek Omega. In this way corrugations in the overlapping border portion of a just-formed convolution are locked to corrugations of the overlapped border portion of the adjoining convolution in the manner of hooks or teeth which engage with each other.

The above-described design of the pressure roller 3 enables the corrugations in two successive convolutions to fit freely into each other at the feeding-in place of the strip, whilst at the same time an effective guiding of the strip is ensured which at this place is particularly useful and whereby the corrugations of the two convolutions are securely inserted into each other. As shown in FIG. 5, two further pressure rollers, 4, 5 are provided in addition to pressure roller 3, the three pressure rollers being distributed around the periphery of the mandrel 2 and spaced-apart from each other by arcs subtended by angles of 120°. The pressure rollers 4, 5 have circumferential grooves (not shown in FIG. 5) which are similar to those in pressure roller 3.

In principle, it is also possible for the surface of the pressure rollers to be without grooves. In this case it would be necessary for this surface to have radial steps of such height that the surface is at the place of entry of the oncoming strip so far away from the mandrel surface as not to compress the corrugations in the strip whilst the remainder of the surface is near enough to the mandrel surface as to cause a compression of the corrugations.

The pressure rollers 3, 4 and 5 may be made from an elastically yielding material.

In order to facilitate removal of the finished tube in the mandrel, the mandrel may taper in the direction of tube removal.

A sealing strip 6, preferably made of plastics, paper coated with an adhesive or the like, may be coiled in-between the corrugations as they are fitted into each other. (FIG. 6). The strip 6 may become hot when the corrugations are reduced in height and may be fused or bonded to the walls of the corrugations in-between which the strip is coiled.

It is further possible to bond a sealing tape 7 extending in the longitudinal direction of the metal strip to one of the two lateral edges of that strip, the sealing tape projecting lateraly beyond the strip edge (FIG. 3). During or after coiling of the metal strip into convolutions, the tape 7 bonded to one convolution is bonded to the border portion of the adjoining convolution.

I claim:

1. A flexible corrugated tube consisting of a succession of axially displaced convolutions obtained by spirally coiling a thin flexible metal strip formed with longitudinally extending corrugations, said corrugations being substantially of wave form, the waves having arcuate crests alternating with similarly shaped troughs, the borders of successive strip portions forming tube convolutions overlapping each other, with at least one trough, extending from one crest to another crest, and one crest, extending from one trough to another trough, of one corrugation in the overlapping border portion of a convolution fitting into one trough, extending from one crest to another crest, and one crest, extending from one trough to another trough, of a corrugation of the overlapped border portion of an adjoining convolution, characterized in that the width in cross section of at least those corrugations fitting into each other at said crests and at said troughs is greater than the width thereof at the portions thereof between said crests and said troughs so that said corrugations fitting into each other are interlocked to each other in the manner of hooks or teeth which engage each other.

* * * * *